United States Patent
Chen

(10) Patent No.: US 10,798,005 B2
(45) Date of Patent: Oct. 6, 2020

(54) OPTIMIZING APPLICATION THROUGHPUT

(71) Applicant: INTERNATIONAL BUSINESS MACHINES CORPORATION, Armonk, NY (US)

(72) Inventor: Hsiulan Chen, Beijing (CN)

(73) Assignee: International Business Machines Corporation, Armonk, NY (US)

(*) Notice: Subject to any disclaimer, the term of this patent is extended or adjusted under 35 U.S.C. 154(b) by 12 days.

(21) Appl. No.: 16/130,503

(22) Filed: Sep. 13, 2018

(65) Prior Publication Data
US 2020/0092209 A1  Mar. 19, 2020

(51) Int. Cl.
| | |
|---|---|
| H04L 12/801 | (2013.01) |
| H04L 12/24 | (2006.01) |
| H04L 12/26 | (2006.01) |
| H04L 12/715 | (2013.01) |
| H04L 12/707 | (2013.01) |
| H04L 12/729 | (2013.01) |
| H04L 12/851 | (2013.01) |
| H04L 12/725 | (2013.01) |

(52) U.S. Cl.
CPC .......... *H04L 47/127* (2013.01); *H04L 41/147* (2013.01); *H04L 43/04* (2013.01); *H04L 43/08* (2013.01); *H04L 45/125* (2013.01); *H04L 45/22* (2013.01); *H04L 45/64* (2013.01); *H04L 47/24* (2013.01); *H04L 45/306* (2013.01)

(58) Field of Classification Search
CPC ..... H04L 47/127; H04L 41/147; H04L 43/04; H04L 43/08; H04L 45/125; H04L 45/22; H04L 46/64; H04L 47/24; H04L 45/306
See application file for complete search history.

(56) References Cited

U.S. PATENT DOCUMENTS

| | | | | |
|---|---|---|---|---|
| 5,854,903 A | * | 12/1998 | Morrison | H04L 49/205 709/249 |
| 7,852,752 B2 | * | 12/2010 | Kano | H04J 14/0227 370/221 |
| 9,038,151 B1 | * | 5/2015 | Chua | H04L 45/02 726/6 |

(Continued)

FOREIGN PATENT DOCUMENTS

WO    20151032971    7/2015

OTHER PUBLICATIONS

Liu, Zehui et al.; An Adaptive Approach for Elephant Flow Detection with the Rapidly Changing Traffic in Data Center Network; Int. J. Network Mgmt; Jun. 1, 2017; 13 pages.

*Primary Examiner* — William G Trost, IV
*Assistant Examiner* — Abdelbasst Talioua
(74) *Attorney, Agent, or Firm* — Schmeiser, Olsen & Watts; William H. Hartwell

(57) ABSTRACT

An approach is provided for optimizing application throughput. Data is collected about traffic flow in a computer network from one or more switches and one or more switches in the computer network. A hot spot destination in the computer network is identified by performing analytics on the collected data about the traffic flow against a traffic pattern in the computer network. An application-optimized software-defined networking (SDN) path is created for new flows to the hot spot destination. In response to an establishment of a new flow, the new flow is forwarded to the application-optimized SDN path.

5 Claims, 4 Drawing Sheets

(56) References Cited

U.S. PATENT DOCUMENTS

| | | | |
|---|---|---|---|
| 9,336,042 B1* | 5/2016 | Brenneman | H04L 41/0813 |
| 9,742,490 B1 | 8/2017 | Anand et al. | |
| 10,298,488 B1* | 5/2019 | Wood | H04L 45/28 |
| 2006/0029016 A1* | 2/2006 | Peles | H04L 69/16 |
| | | | 370/328 |
| 2006/0156032 A1* | 7/2006 | Panjwani | G06F 21/85 |
| | | | 713/191 |
| 2008/0114892 A1 | 5/2008 | Bruno et al. | |
| 2009/0086642 A1* | 4/2009 | Davis | H04L 45/127 |
| | | | 370/242 |
| 2013/0329601 A1 | 12/2013 | Yin | |
| 2014/0193154 A1* | 7/2014 | Graham | H04L 67/28 |
| | | | 398/79 |
| 2014/0229945 A1* | 8/2014 | Barkai | H04L 49/70 |
| | | | 718/1 |
| 2015/0016815 A1* | 1/2015 | Maggiari | H04J 14/0287 |
| | | | 398/5 |
| 2015/0163159 A1* | 6/2015 | DeCusatis | H04L 47/76 |
| | | | 709/226 |
| 2015/0172102 A1* | 6/2015 | DeCusatis | H04L 45/38 |
| | | | 370/218 |
| 2015/0172183 A1 | 6/2015 | DeCusatis et al. | |
| 2015/0244580 A1 | 8/2015 | Saavedra | |
| 2015/0244617 A1* | 8/2015 | Nakil | G06F 9/45558 |
| | | | 709/224 |
| 2016/0028625 A1* | 1/2016 | Hari | H04L 45/74 |
| | | | 370/392 |
| 2016/0057061 A1* | 2/2016 | Avci | H04L 47/125 |
| | | | 370/235 |
| 2016/0142251 A1* | 5/2016 | Contreras | H04L 41/0806 |
| | | | 709/220 |
| 2016/0182329 A1* | 6/2016 | Armolavicius | H04L 41/0893 |
| | | | 370/230 |
| 2016/0254995 A1* | 9/2016 | Wang | H04L 45/54 |
| | | | 370/392 |
| 2017/0048312 A1* | 2/2017 | Moyer | H04L 43/12 |
| 2017/0078183 A1* | 3/2017 | Civanlar | H04L 45/02 |
| 2017/0085630 A1* | 3/2017 | Luo | H04L 45/56 |
| 2017/0104651 A1* | 4/2017 | Kakadia | H04L 12/2854 |
| 2017/0230267 A1 | 8/2017 | Armolavicius | |
| 2017/0237667 A1* | 8/2017 | Wang | H04L 45/7457 |
| | | | 709/226 |
| 2017/0331725 A1* | 11/2017 | Rosenberry | H04L 49/253 |
| 2017/0346716 A1* | 11/2017 | Zheng | H04L 45/38 |
| 2017/0346726 A1* | 11/2017 | Menon | H04L 41/0668 |
| 2017/0366426 A1* | 12/2017 | Li | H04W 76/10 |
| 2018/0006928 A1* | 1/2018 | Luo | H04L 45/121 |
| 2018/0115466 A1* | 4/2018 | Kazemian | H04L 41/147 |
| 2018/0167325 A1* | 6/2018 | Li | H04L 45/025 |
| 2018/0287932 A1* | 10/2018 | Viquez Calderon | H04L 45/38 |
| 2018/0288002 A1* | 10/2018 | Petrick | H04L 43/14 |
| 2018/0331960 A1* | 11/2018 | Browne | H04L 47/2441 |
| 2019/0104041 A1* | 4/2019 | Tabak | G06F 17/246 |
| 2019/0268375 A1* | 8/2019 | Gundavelli | H04L 63/20 |
| 2019/0342190 A1* | 11/2019 | Warmenhoven | H04L 43/062 |
| 2019/0342219 A1* | 11/2019 | Liu | H04L 47/24 |
| 2020/0137113 A1* | 4/2020 | Thomas | H04L 63/101 |

* cited by examiner

OPTIMIZING APPLICATION THROUGHPUT

BACKGROUND

The present invention relates to computer network design, and more particularly to optimizing network paths for applications.

Traditional data center network topology is based on the underlying networking technology, including network protocols such as a Spanning Tree Protocol (STP) and Internet Protocol (IP). In a highly redundant network design, multiple links exist between a pair of different endpoints. Data center network design is focused on layers 1 through 3 of the Open Systems Interconnection (OSI) reference model and applications run at layer 7 of the OSI model.

In a known technique employing a highly redundant network design, the underlying networking technology restricts data center network topology because although multiple links exist between a pair of different endpoints, there typically is a very limited subset of those links available to the top layer endpoints. Most of the redundant links are either blocked by layer 2 protocols or shadowed by layer 3 routing protocols (i.e., IP route selection).

Using known network design techniques employing static network designs and traditional networking protocols, it is not possible to optimize traffic performance for each hosted networked application. For example, all the hosts on the same layer 2 domain share the same layer 2 topology, and all the hosts on the same layer 3 domain share the same layer 3 topology, so that any number of applications hosted on these hosts follow the same network path to reach a designated destination.

A particular network design is not appropriate for all applications. While some applications demand fast response time, other applications may demand high throughput from the network. Traditionally, network designers employ techniques such as Resource Reservation Protocol (RSVP) or Quality of Service (QoS) engineering to meet various application requirements, but these techniques cannot support customized traffic paths for different applications, let alone increase network capacity specifically for the applications that need the increased capacity.

As cloud computing becomes pervasive, there is a trend to move from traditional storage area network (SAN) based storage systems to IP-based storage systems (e.g., Internet Small Computer Systems Interface (iSCSI)). Hosts that use known backup techniques that perform backups simultaneously in a limited backup window and towards the same set of backup servers generate network traffic having non-optimal throughput because of bottlenecks in the switches, servers, disks, etc. in the network. All available links in the known network designs are not used for the backups, which leads to throughput that is not maximized.

With the introduction of software-defined networking (SDN), current network design techniques can define the network path according to application-specific requirements. One common technique is to employ OpenFlow® switches to define a custom traffic path according to Open Flow® table entries. OpenFlow is a registered trademark of Open Networking Foundation located in Palo Alto, Calif. Application owners must have expertise in network technology to use SDN to optimize network paths for their applications.

SUMMARY

In one embodiment, the present invention provides a computer-implemented method of optimizing application throughput. The method includes collecting, by one or more processors, data about traffic flow in a computer network from one or more switches and one or more switches in the computer network. The method further includes identifying, by the one or more processors, a hot spot destination in the computer network by performing analytics on the collected data about the traffic flow against a traffic pattern in the computer network. The method further includes creating, by the one or more processors, an application-optimized software-defined networking (SDN) path for new flows to the hot spot destination. The method further includes in response to an establishment of a new flow, forwarding, by the one or more processors, the new flow to the application-optimized SDN path.

The aforementioned embodiment provides an increase in application throughput via load sharing between parallel paths.

In one optional aspect of the aforementioned embodiment, the method further includes identifying, by the one or more processors, new traffic for backing up data from one or more hosts to one or more backup servers. The method further includes forwarding, by the one or more processors, the new traffic to the application-optimized SDN path, which bypasses processing in layer 2 and layer 3 of an Open Systems Interconnection (OSI) model. The aforementioned aspect advantageously allows simultaneous flows to spread out to different links of a data center and avoid redundant links being blocked by layer 2 protocols or shadowed by layer 3 routing protocols.

In another embodiment, the present invention provides a computer program product for optimizing application throughput. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes the computer system collecting data about traffic flow in a computer network from one or more switches and one or more switches in the computer network. The method further includes the computer system identifying a hot spot destination in the computer network by performing analytics on the collected data about the traffic flow against a traffic pattern in the computer network. The method further includes the computer system creating an application-optimized software-defined networking (SDN) path for new flows to the hot spot destination. The method further includes in response to an establishment of a new flow, the computer system forwarding the new flow to the application-optimized SDN path.

Advantages of the aforementioned computer program product embodiment include the advantages discussed above relative to the embodiment that provides the method of optimizing application throughput. Optional aspects of the aforementioned computer program product embodiment include the aspects discussed above relative to the embodiment that provides the method of optimizing application throughput. Advantages of the optional aspects of the computer program product embodiment include the advantages discussed above relative to the embodiment that provides the method of optimizing application throughput.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of optimizing application throughput. The method includes the computer system collecting data about traffic flow in a computer network from one or more switches and one or more switches in the computer network. The method further includes the computer system identifying a hot spot destination in the computer network by performing analytics on the collected data about the traffic flow against a traffic pattern in the computer network. The method further includes the computer system creating an application-optimized software-defined networking (SDN) path for new flows to the hot spot destination. The method further includes in response to an establishment of a new flow, the computer system forwarding the new flow to the application-optimized SDN path.

Advantages of the aforementioned computer system embodiment include the advantages discussed above relative to the embodiment that provides the method of optimizing application throughput. Optional aspects of the aforementioned computer system embodiment include the aspects discussed above relative to the embodiment that provides the method of optimizing application throughput. Advantages of the optional aspects of the computer system embodiment include the advantages discussed above relative to the embodiment that provides the method of optimizing application throughput.

DETAILED DESCRIPTION

Overview

Figure 1:
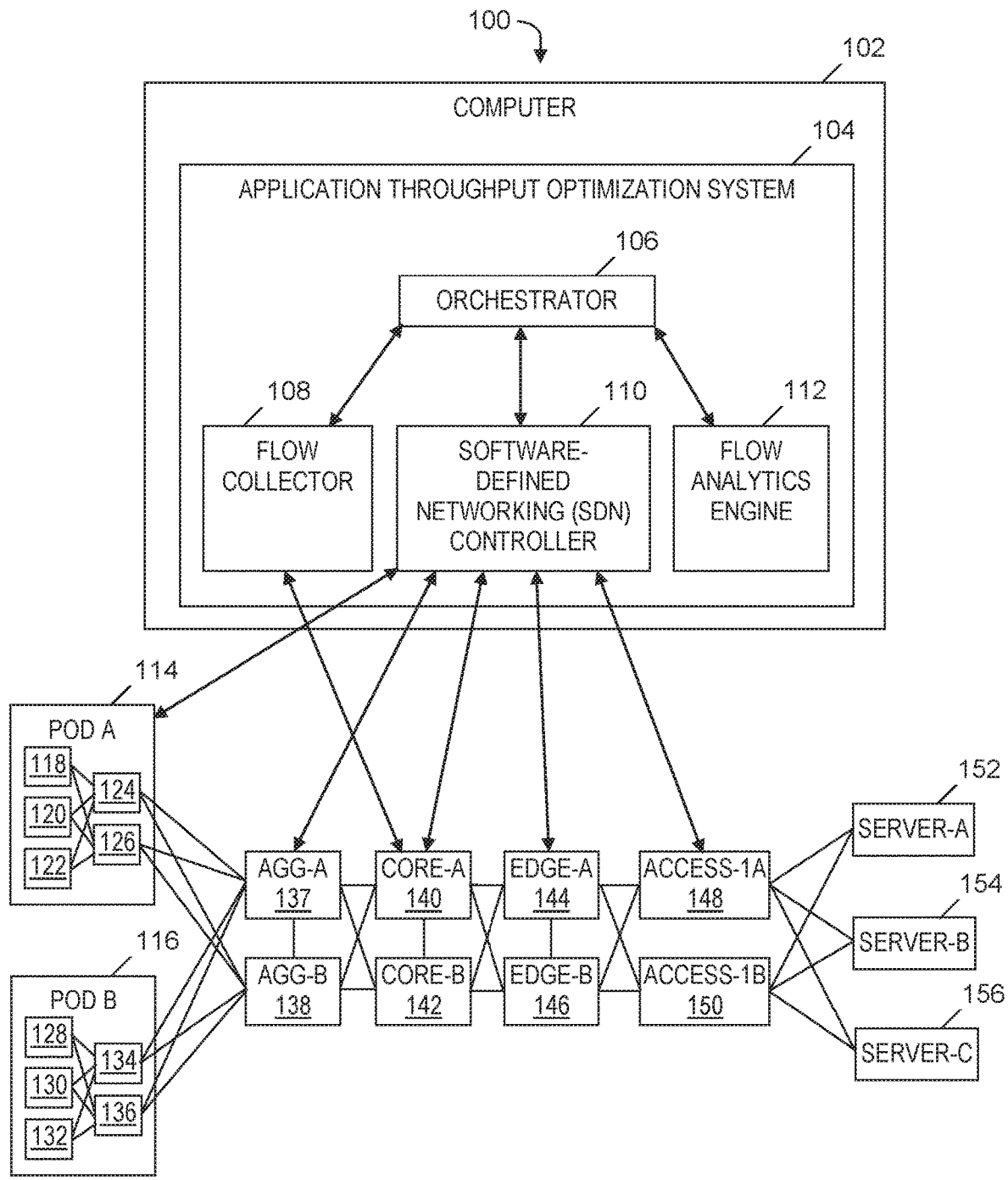
FIG. 1 is a block diagram of a system for optimizing application throughput, in accordance with embodiments of the present invention.

Embodiments of the present invention optimize a network path for an application based on the network profile of the application observed from dynamic traffic analytics. Embodiments of the present invention perform dynamic analytics on collected traffic flow data to identify application hotspots and subsequently enable traffic flowing to the application hotspots through multiple paths as computed by an upper layer orchestrator. The multiple paths are implemented and programmed onto intermediate SDN switches through an instruction issued from a SDN controller, thereby resulting in a highly optimized network paths for the application hotspots, while bypassing traditional layer 2 and layer 3 processing in the intermediate hops. Embodiments of the present invention provide load sharing between parallel network paths to achieve application throughput optimization, thereby avoiding the limitations of the traditional spanning tree protocol and IP route selection, which address redundancy and reliability.

One or more embodiments provide a "self-driving" network that observes real traffic of applications, performs analytics on the applications, and re-routes high demand application traffic by using SDN and based on known traffic patterns. In one embodiment, the system for application throughput optimization does not re-route or optimize every application on the network; instead, the orchestrator selects the most demanding traffic to optimize, while leaving the remaining traffic to follow the traditional layer 2 and layer 3 processing.

In one embodiment, a cloud-based data center network design moves away from traditional static network redundant design plus dynamic network protocol functions, which targeted collective applications having similar network requirements, and instead provides a virtualized network redundant design plus a dynamic software-based network functions platform, which achieves a more application-centric and more granular network intelligence that can better meet the highly varied application demands in a cloud environment.

In one embodiment, IP-based storage traffic is enabled and optimized in a converged IP cloud network, which avoids a requirement to build a more expensive and dedicated SAN network, which is a common requirement in known cloud environments.

Again, known network design techniques such as RSVP or QoS engineering meet varied application requirements while failing to support customized traffic paths for each different application and failing to increase network capacity specifically for those applications that require the increase. The failure to support customized traffic paths for each different application and the failure to increase network capacity for specific applications present a unique challenge that is overcome by embodiments of the present invention.

To address the challenge of supporting hosts that must perform backups simultaneously in a limited backup window of time and towards the same set of backup servers, one or more embodiments provide a system for leveraging all available links to achieve the maximum throughput.

Again, when employing OpenFlow® switches to define custom traffic paths according to OpenFlow® table entries, application owners must have expertise in network technology to successfully optimize the network for their applications through SDN. Through one or more embodiments, an orchestrator optimizes application throughput and utilizes the benefits of SDN without the application owner needing to understand network technology or SDN.

As used herein, the term "flow" means network traffic flow.

System for Optimizing Application Throughput

FIG. 1 is a block diagram of a system 100 for optimizing application throughput, in accordance with embodiments of the present invention. System 100 includes a computer 102 which executes a software-based application throughput optimization system 104, which includes a flow collector 108, a SDN controller 110, and a flow analytics engine 112.

Application throughput optimization system 104 generates an optimized network path for an application based on the network profile of the application observed from dynamic traffic analytics. The application can be executing in a client (i.e., client computer) in a first pod 114 (i.e., Pod A) or a second pod 116 (i.e., Pod B). Pod A includes clients 118, 120, and 122 and SDN access switches 124 and 126. Pod B includes clients 128, 130, and 132 and SDN access switches 134 and 136. Hereinafter, switches 124, 126, 134, and 136 are also referred to as Pod switches. Other embodiments include variations of system 100, where each variation can include a different number of pods and/or a different number of clients and switches within each pod. In another embodiment, application throughput optimization system 104 in a variation of system 100 is a combination of hardware and software, which includes orchestrator 106, flow collector 108, SDN controller 110, flow analytics 112, and switches 124, 126, 134, 136, 137, 138, 140, 142, 144, 146, 148, 150.

A network path for an application uses one of the links between the aforementioned clients and switches in a pod and a further series of links to one of the aggregation switches 137 and 138, one of the core switches 140 and 142, one of the edge switches 144 and 146, and one of the SDN access switches 148 and 150. The network path ends with a link to one of servers 152, 154, and 156 (i.e., server computers). In other embodiments, the numbers of aggregation switches, core switches, edge switches, SDN access switches and servers can be different from the numbers of switches illustrated in FIG. 1. In other embodiments, one or more of the aggregation, core, and edge switches are replaced with other types of switches. In other embodiments, one or more of the aggregation, core, and edge switches in FIG. 1 are replaced with routers.

Flow collector 108 collects traffic flow data (not shown) from network switches and routers, such as core switch 140, and sends the collected traffic flow data to orchestrator 106. In one embodiment, flow collector 108 includes one or more sensors that monitor the amount, source, and destination of network traffic at network switches and routers including core switch 140.

Orchestrator 106 directs flow analytics engine 112 to run analytics against the collected traffic flow data and historic traffic patterns in the network to identify one or more hot spot destinations and a date and time at which a destination in the network is expected to become a hot spot destination (i.e., identify which traffic from an application needs to be separated into different network paths to optimize the application throughput). As used herein, a hot spot destination is defined as a destination in a network that receives, in a specified period of time, an amount of network traffic that exceeds a predetermined threshold amount. Orchestrator 106 sends the results of running the analytics to SDN controller 110, which enables new path entries into all the SDN access switches 124, 126, 134, and 136, which allows SDN controller 110 to create a "fast-path" (i.e., a path that optimizes application throughput) for all new flows to an identified hot spot destination. The fast-path consists of one or more of the switches 124, 126, 134, 136, 137, 138, 140, 142, 144, 146, 148, and 150, which provides a path from one of clients 118, 120, 122, 128, 130, or 132 to one of servers 152, 154, or 156. One of the SDN access switches 124, 126, 134, and 136 detects a new flow that matches predefined selection criteria and in response, forwards the new flow to the fast-path, thereby avoiding the layer 2 spanning tree and layer 3 route selection, while implementing a new forwarding topology purely based on the new fast-path topology to the hot spot destination. In one embodiment, SDN controller 110 creates the fast-path, which separates the network traffic into first and second paths by marking a first portion of the traffic as being destined for a first switch in the first path and marking a second portion of the traffic as being destined for a second switch in the second path. To provide the separation of the network traffic into different paths, system 100 may employ, for example, OpenFlow® protocol or network overlays based on Border Gateway Protocol (BGP), Ethernet Virtual Private Network (EVPN), or Virtual Extensible Local Area Network (VXLAN).

In one embodiment, the historic traffic pattern indicates a daily backup traffic at a particular time of day in predetermined days of the week from hosts to destination(s) in a specified set of backup servers. Orchestrator 106 identifies all new backup traffic and forwards the backup traffic to a selected fast-path to bypass layer 2 and layer 3 processing. The new fast-path-based topology uses all links to the backup server(s), which enables network capacity to support a growth in throughput (e.g., doubling the throughput), as compared to traditional techniques that use a legacy path by which only active links are used and idle links are not used. In one embodiment, application throughput optimization system 104 creates an alternate path so that half of the backup traffic is re-routed to the alternate path, where the alternate path corresponds to an inactive or secondary path in a traditional topology. In one embodiment, switches 124, 126, 134, and 136 determine which flows to switch to the alternate path based on predefined selection criteria. In one embodiment, the selection criteria indicate a switch to an alternate path for all flows whose hosts are within a specified pod. Alternatively, the selection criteria indicate a switch to an alternate path for all flows whose hosts are within a specified IP subnet, which enables a more granular placement decision. As another alternative, the selection criteria indicate switching to alternate paths based on amounts of traffic being sent by different VMs.

Figure 2:
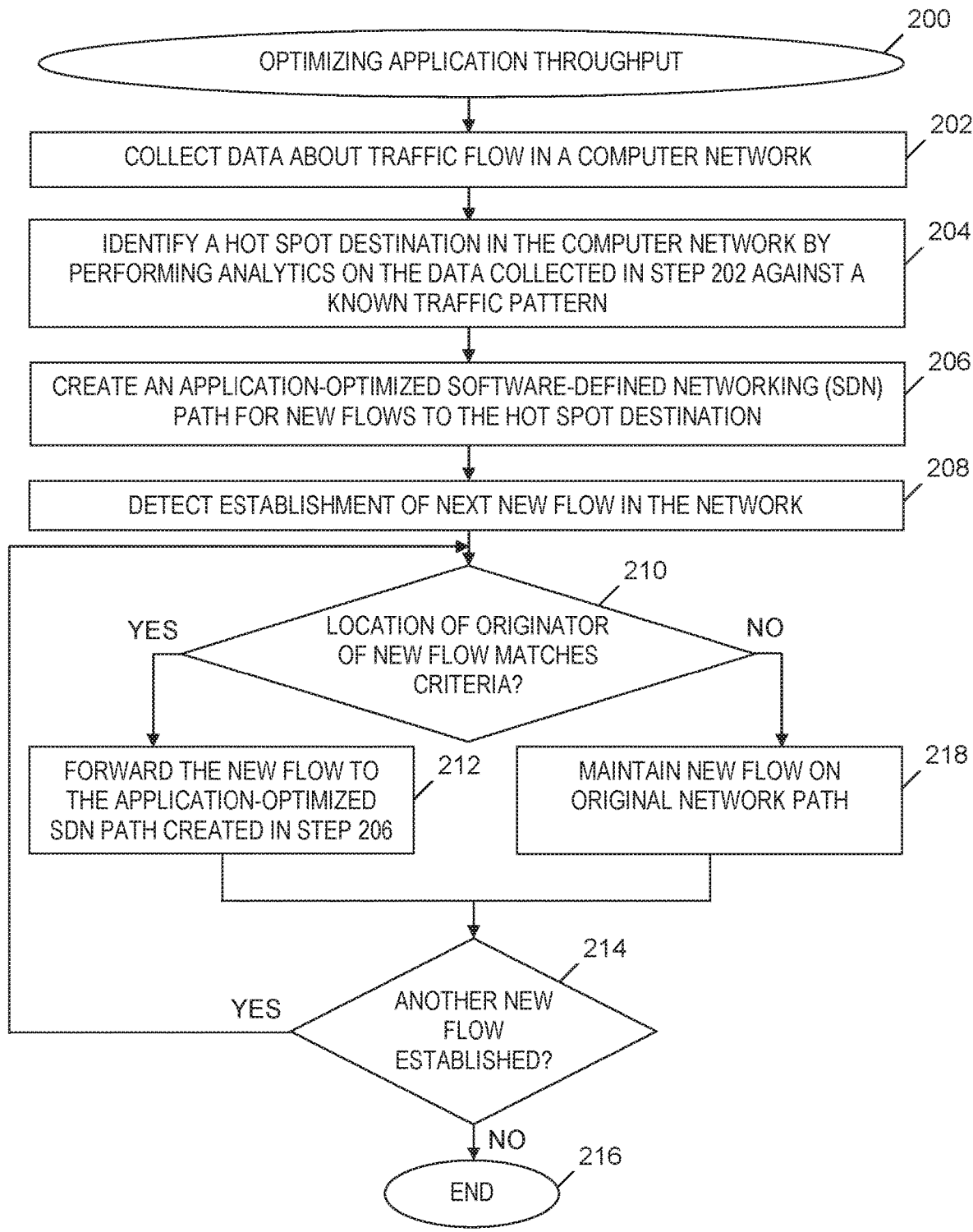
FIG. 2 is a flowchart of a process of optimizing application throughput, where the process is implemented in the system of FIG. 1, in accordance with embodiments of the present invention.
Figure 3:
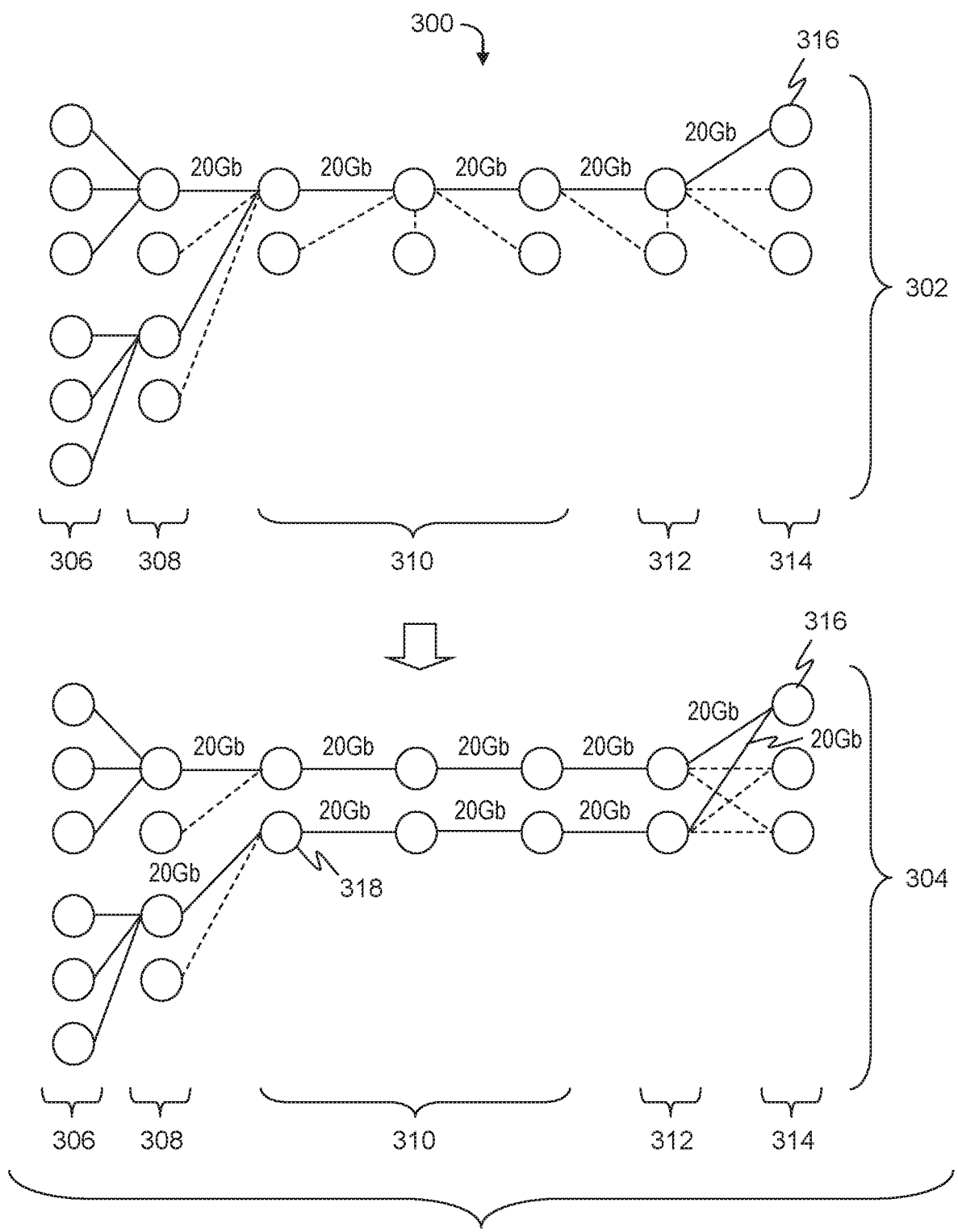
FIG. 3 is an example of the application throughput optimization resulting from using the process of FIG. 2 in the system of FIG. 1, in accordance with embodiments of the present invention.

The functionality of the components shown in FIG. 1 is described in more detail in the discussion of FIG. 2 and FIG. 3 presented below.

Process for Optimizing Application Throughput

FIG. 2 is a flowchart of a process of optimizing application throughput, where the process is implemented in the system of FIG. 1, in accordance with embodiments of the present invention. The process of FIG. 2 starts at step 200. In step 202, application throughput optimization system 104 (see FIG. 1) collects data about traffic flow in a computer network. In one embodiment, the data collected in step 202 is from network switches and/or network routers (e.g., switches 137, 138, 140, 142, 144, 146, 148, and 150 in FIG. 1). In one embodiment, flow collector 108 (see FIG. 1) performs step 202.

In step 204, application throughput optimization system 104 (see FIG. 1) identifies a hot spot destination in the computer network by performing analytics on the collected data against a known network traffic pattern. Application throughput optimization system 104 (see FIG. 1) can receive known network traffic patterns that are determined by another system, or that are determined from repeatedly collecting traffic flow data in step 202. In one embodiment, the known network traffic pattern is a pattern of daily backup traffic that occurs at a particular time of day on predetermined days of the week, where the destination of the backup traffic is a predetermined set of backup servers. In one embodiment, flow analytics engine 112 (see FIG. 1) performs step 204.

In step 206, application throughput optimization system 104 (see FIG. 1) creates an application-optimized SDN path (i.e., a fast-path) for new flows to the hot spot destination identified in step 204. The creation of the application-optimized SDN path is based on the results of the analytics performed in step 204. The application-optimized SDN path consists of one or more SDN switches. The SDN controller 110 (see FIG. 1) sends SDN control commands to all the SDN switches in the application-optimized SDN path to instruct the SDN switches to forward the new flow according to the application-optimized SDN path. The application-optimized SDN path is an alternative to an original network path. In one embodiment, the original network path is determined by a layer 2 spanning tree protocol or a layer 3 route selection.

In step 208, one of the Pod switches 124, 126, 134, or 136 (see FIG. 1) detects an establishment of a next new flow in the computer network.

In step 210, one of the Pod switches 124, 126, 134, or 136 (see FIG. 1) determines whether the location of the originator (i.e., source) of the new flow matches predefined selection criteria. In one embodiment, the Pod switch that detects the establishment of the next new flow in step 208 performs step 210. If the Pod switch 124, 126, 134, or 136 determines in step 210 that the location of the originator of the new flow matches the predefined selection criteria, then the Yes branch of step 210 is followed and step 212 is performed. In step 212, the Pod switch 124, 126, 134, or 136 (see FIG. 1) forwards the new flow to the application-optimized SDN path created in step 206 via the selected SDN aggregation access switch 136 or 138 (see FIG. 1), thereby ignoring the layer 2 spanning tree protocol and the layer 3 route selection. For example, the application-optimized SDN path in step 212 includes switches 124, 138, 142, 146, and 150 (see FIG. 1).

In step 214, application throughput optimization system 104 (see FIG. 1) monitors the network to determine whether there is an establishment of another new flow (i.e., a next new flow). If one of the Pod switches 124, 126, 134, or 136 (see FIG. 1) in step 214 detects an establishment of another new flow, then the Yes branch of step 214 is followed and the process of FIG. 2 loops back to step 210, as described above. If the Pod switches 124, 126, 134, and 136 (see FIG. 1) in step 214 determine that another new flow is not established, then the No branch of step 214 is followed and the process of FIG. 2 ends at step 216.

Returning to step 210, if one of the Pod switches 124, 126, 134, or 136 (see FIG. 1) determines that the location of the originator of the new flow does not match the predefined selection criteria, then the No branch of step 210 is followed and step 218 is performed. In step 218, application throughput optimization system 104 (see FIG. 1) maintains the new flow on the original network path without using the application-optimized SDN path created in step 206. Following step 218, the process of FIG. 2 continues with step 214, as described above.

EXAMPLE

FIG. 3 is an example 300 of the application throughput optimization resulting from using the process of FIG. 2 in the system of FIG. 1, in accordance with embodiments of the present invention. Example 300 includes an initial network design 302, which employs a traditional layer 3 topology and does not employ the application-optimized SDN path created in step 206 (see FIG. 2). Example 300 also includes a subsequent network design 304, which replaces initial network design 302 and employs the application-optimized SDN path created in step 206 (see FIG. 2). Network designs 302 and 304 include clients 306, SDN switches 308, 310, and 312, and servers 314 for backup data. The dotted lines in FIG. 3 indicate redundant links in the network. The redundant links in initial network design 302 are not active and network traffic does not flow through the redundant links in initial network design 302. A sequence of solid straight lines in network designs 302 and 304 indicates a path of traffic flow whose destination is a server 316.

Daily backups of customer data on clients 306 are initially sent to server 316 in a traffic flow in initial network design 302, where the traffic flow has a 20 gigabits (Gb) per second throughput. In step 202 (see FIG. 2), application throughput optimization system 104 (see FIG. 1) collects data about the traffic flow to server 316. In step 204 (see FIG. 2), application throughput optimization system 104 (see FIG. 1) performs analytics on the data collected in step 202 (see FIG. 2) and compares the results of the analytics to historical traffic patterns. Based on the analytics and a match to one of the traffic patterns, application throughput optimization system 104 (see FIG. 1) in step 204 (see FIG. 2) identifies server 316 as being a hot spot destination in the network. In step 206, application throughput optimization system 104 (see FIG. 1) creates the subsequent network design 304, which includes the application-optimized SDN path for a new flow to server 316, where the location of the originator of the new flow meets predefined criteria and where the path extends through an SDN switch 318 to server 316. Using network design 304, SDN controller 110 (see FIG. 1) instructs SDN switches 308, 310, and 312 to spread the network traffic over two different paths indicated by the straight lines whose destination is server 316. By spreading the network traffic to the two paths, network design 304 provides a throughput of 40 Gb per second, which is double the throughput of the initial network design 302 (i.e., 20 Gb per second throughput using the same path used in the initial network design 302 plus an additional 20 Gb per second using the application-optimized SDN path created in step 206 (see FIG. 2)). That is, given the same amount of traffic in network design 302 and network design 304, the traffic flows to server 316 in network design 304 in half the time the same traffic flows to server 316 in network design 302.

Computer System

Figure 4:
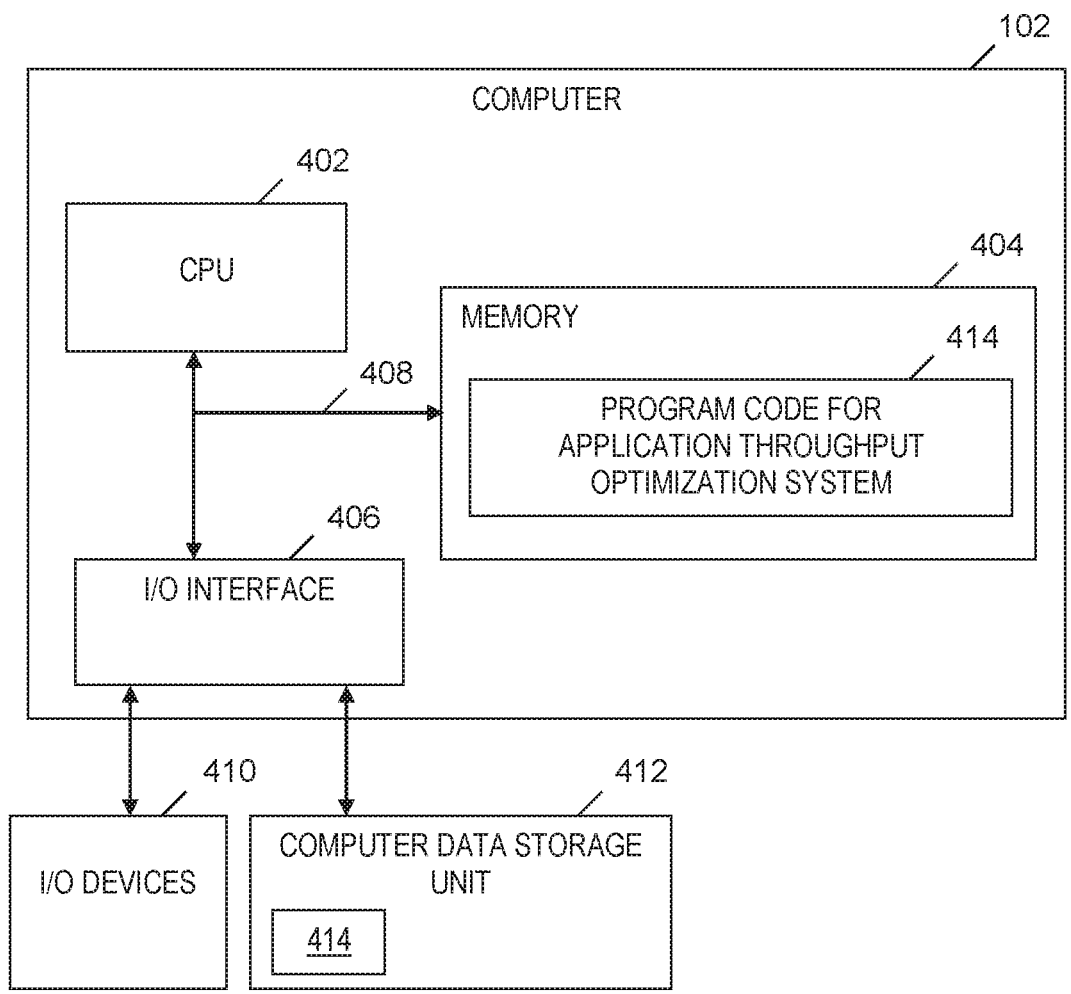
FIG. 4 is a block diagram of a computer included in the system of FIG. 1 and that implements the process of FIG. 2, in accordance with embodiments of the present invention.

FIG. 4 is a block diagram of a computer included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for application throughput optimization system 104 (see FIG. 1) to perform a method of optimizing application throughput, where the instructions are executed by CPU 402 via memory 404. CPU 402 may include a single processing unit or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to optimize application throughput. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to optimizing application throughput. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to optimize application throughput. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of optimizing application throughput.

While it is understood that program code 414 for optimizing application throughput may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of optimizing application throughput. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, switches, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of optimizing application throughput, the method comprising the steps of:
   generating, by one or more processors, an initial network design of a computer network that includes (i) an original network path to a backup server computer that includes a first set of links which are active links and (ii) a second set of links to the backup server computer that are inactive and redundant to the first set of links, the initial network design being based on a spanning tree protocol provided by processing in layer 2 that blocks the second set of links or an Internet Protocol (IP) route selection protocol provided by processing in layer 3 that shadows the second set of links, and the layer 2 and the layer 3 being layers in an Open Systems Interconnection model;
   collecting, by the one or more processors, data about traffic flow in the computer network from one or more switches and one or more routers in the computer network;
   identifying, by the one or more processors, the backup server computer as a hot spot destination in the computer network by performing analytics on the collected data about the traffic flow, the analytics indicating that the traffic flow matches a historical traffic pattern that indicates that (i) data is backed up from applications to the backup server computer and (ii) the applications from which the data is backed up are executed in a first pod of hosts;
   in response to the backup server computer being identified as the hot spot destination, creating, by the one or more processors, an application-optimized software-defined networking (SDN) path that specifies a first path to the backup server computer and a second path to the backup server computer, the first and second paths utilizing the first set of links and the second set of links for new flows to backup data to the backup server computer in a subsequent network design of the computer network;

detecting, by the one or more processors, that (i) a first new flow is backing up first data from a first application to the backup server computer and (ii) the first application is being executed by a first host in the first pod;

detecting, by the one or more processors, that (i) a second new flow is backing up second data from a second application to the backup server computer and (ii) the second application is being executed by a second host in the first pod;

in response to the detecting that the first and second new flows are backing up the first and second data, respectively, to the backup server computer which is the hot spot destination and that the first and second applications are being executed in the first pod, replacing, by the one or more processors, the initial network design with the subsequent network design and activating, by the one or more processors, the second set of links in the subsequent network design;

forwarding, by the one or more processors, the first and second new flows to the application-optimized SDN path so that the first new flow is forwarded to the backup server computer via the first set of links and the second new flow is forwarded to the backup server computer via the second set of links that are active but were inactive prior to the initial network design being replaced with the subsequent network design; and in response to the replacing the initial network design with the subsequent network design and the forwarding the first and second new flows, bypassing the processing in layer 2 that blocks the second set of links, bypassing the processing in layer 3 that shadows the second set of links, and providing a throughput of the backing up of the first and second data by the first and second applications using the first and second set of links according to the subsequent network design, so that the throughput is improved over another throughput of a backup of the first and second data by the first and second applications using the first set of links but not the second set of links according to the initial network design.

2. The method of claim 1, further comprising the step of configuring, by the one or more processors, the application-optimized SDN path on SDN switches.

3. The method of claim 1, further comprising the step of: providing at least one support service for at least one of creating, integrating, hosting, maintaining, and deploying computer readable program code in the computer, the program code being executed by a processor of the computer to implement the steps of generating the initial network design, collecting the data about the traffic flow, identifying the backup server computer as the hot spot destination, creating the application-optimized SDN path, detecting that (i) the first new flow is backing up the first data and (ii) the first application is being executed by a first host in the first pod, detecting that (i) the second new flow is backup the second data and (ii) the second application is being executed by a second host in the first pod, replacing the initial network design with the subsequent network design, activating the second set of links, and forwarding the first and second new flows to the application-optimized SDN path, bypassing the processing in layer 2, bypassing the processing in layer 3, and providing the throughput so that the throughput is improved over another throughput.

4. A computer program product for optimizing application throughput, the computer program product comprising a computer readable storage medium having computer readable program code stored on the computer readable storage medium, wherein the computer readable storage medium is not a transitory signal per se, the computer readable program code being executed by a central processing unit (CPU) of a computer system to cause the computer system to perform a method comprising the steps of:

the computer system generating an initial network design of a computer network that includes (i) an original network path to a backup server computer that includes a first set of links which are active links and (ii) a second set of links to the backup server computer that are inactive and redundant to the first set of links, the initial network design being based on a spanning tree protocol provided by processing in layer 2 that blocks the second set of links or an Internet Protocol (IP) route selection protocol provided by processing in layer 3 that shadows the second set of links, and the layer 2 and the layer 3 being layers in an Open Systems Interconnection model;

the computer system collecting data about traffic flow in the computer network from one or more switches and one or more routers in the computer network;

the computer system identifying the backup server computer as a hot spot destination in the computer network by performing analytics on the collected data about the traffic flow, the analytics indicating that the traffic flow matches a historical traffic pattern that indicates that (i) data is backed up from applications to the backup server computer and (ii) the applications from which the data is backed up are executed in a first pod of hosts;

in response to the backup server computer being identified as the hot spot destination, the computer system creating an application-optimized software-defined networking (SDN) path that specifies a first path to the backup server computer and a second path to the backup server computer, the first and second paths utilizing the first set of links and the second set of links for new flows to backup data to the backup server computer in a subsequent network design of the computer network;

the computer system detecting that (i) a first new flow is backing up first data from a first application to the backup server computer and (ii) the first application is being executed by a first host in the first pod;

the computer system detecting that (i) a second new flow is backing up second data from a second application to the backup server computer and (ii) the second application is being executed by a second host in the first pod;

in response to the detecting that the first and second new flows are backing up the first and second data, respectively, to the backup server computer which is the hot spot destination and that the first and second applications are being executed in the first pod, the computer system replacing the initial network design with the subsequent network design and the computer system activating the second set of links in the subsequent network design;

the computer system forwarding the first and second new flows to the application-optimized SDN path so that the first new flow is forwarded to the backup server computer via the first set of links and the second new flow is forwarded to the backup server computer via the second set of links that are active but were inactive prior to the initial network design being replaced with the subsequent network design; and in response to the replacing the initial network design with the subsequent network design and the forwarding the first and second new flows, the computer system bypassing the processing in layer 2 that blocks the second set of links, the computer system bypassing the processing in layer 3 that shadows the second set of links, and the computer system providing a throughput of the backing up of the first and second data by the first and second applications using the first and second set of links according to the subsequent network design, so that the throughput is improved over another throughput of a backup of the first and second data by the first and second applications using the first set of links but not the second set of links according to the initial network design.

5. A computer system comprising:

a central processing unit (CPU);

a memory coupled to the CPU; and a computer readable storage medium coupled to the CPU, the computer readable storage medium containing instructions that are executed by the CPU via the memory to implement a method of optimizing application throughput, the method comprising the steps of:

the computer system generating an initial network design of a computer network that includes (i) an original network path to a backup server computer that includes a first set of links which are active links and (ii) a second set of links to the backup server computer that are inactive and redundant to the first set of links, the initial network design being based on a spanning tree protocol provided by processing in layer 2 that blocks the second set of links or an Internet Protocol (IP) route selection protocol provided by processing in layer 3 that shadows the second set of links, and the layer 2 and the layer 3 being layers in an Open Systems Interconnection model;

the computer system collecting data about traffic flow in the computer network from one or more switches and one or more routers in the computer network;

the computer system identifying the backup server computer as a hot spot destination in the computer network by performing analytics on the collected data about the traffic flow, the analytics indicating that the traffic flow matches a historical traffic pattern that indicates that (i) data is backed up from applications to the backup server computer and (ii) the applications from which the data is backed up are executed in a first pod of hosts;

in response to the backup server computer being identified as the hot spot destination, the computer system creating an application-optimized software-defined networking (SDN) path that specifies a first path to the backup server computer and a second path to the backup server computer, the first and second paths utilizing the first set of links and the second set of links for new flows to backup data to the backup server computer in a subsequent network design of the computer network;

the computer system detecting that (i) a first new flow is backing up first data from a first application to the backup server computer and (ii) the first application is being executed by a first host in the first pod;

the computer system detecting that (i) a second new flow is backing up second data from a second application to the backup server computer and (ii) the second application is being executed by a second host in the first pod;

in response to the detecting that the first and second new flows are backing up the first and second data, respectively, to the backup server computer which is the hot spot destination and that the first and second applications are being executed in the first pod, the computer system replacing the initial network design with the subsequent network design and the computer system activating the second set of links in the subsequent network design;

the computer system forwarding the first and second new flows to the application-optimized SDN path so that the first new flow is forwarded to the backup server computer via the first set of links and the second new flow is forwarded to the backup server computer via the second set of links that are active but were inactive prior to the initial network design being replaced with the subsequent network design; and in response to the replacing the initial network design with the subsequent network design and the forwarding the first and second new flows, the computer system bypassing the processing in layer 2 that blocks the second set of links, the computer system bypassing the processing in layer 3 that shadows the second set of links, and the computer system providing a throughput of the backing up of the first and second data by the first and second applications using the first and second set of links according to the subsequent network design, so that the throughput is improved over another throughput of a backup of the first and second data by the first and second applications using the first set of links but not the second set of links according to the initial network design.

* * * * *